(12) United States Patent
Zhu et al.

(10) Patent No.: US 8,098,468 B2
(45) Date of Patent: Jan. 17, 2012

(54) HARDWARE OVERVOLTAGE DISCONNECTING CIRCUIT

(75) Inventors: Chunhui Zhu, Guangdong (CN);
Jingjing Huang, Guangdong (CN);
Shudu Liu, Guangdong (CN)

(73) Assignee: Emerson Network Power, Energy Systems, North America, Inc., Lorain, OH (US)

( * ) Notice: Subject to any disclaimer, the term of this patent is extended or adjusted under 35 U.S.C. 154(b) by 528 days.

(21) Appl. No.: 12/297,049

(22) PCT Filed: Feb. 13, 2007

(86) PCT No.: PCT/CN2007/000508
§ 371 (c)(1),
(2), (4) Date: Feb. 6, 2009

(87) PCT Pub. No.: WO2007/118400
PCT Pub. Date: Oct. 25, 2007

(65) Prior Publication Data
US 2009/0174977 A1  Jul. 9, 2009

(30) Foreign Application Priority Data

Apr. 13, 2006  (CN) .......................... 2006 1 0074786

(51) Int. Cl.
*H02H 3/20* (2006.01)
*H02H 9/04* (2006.01)

(52) U.S. Cl. ..................................................... 361/91.1

(58) Field of Classification Search ............... 361/91.1
See application file for complete search history.

(56) References Cited

U.S. PATENT DOCUMENTS

| | | | | |
|---|---|---|---|---|
| 5,920,186 | A * | 7/1999 | Ninh et al. | 323/303 |
| 6,628,013 | B2 * | 9/2003 | Vogman | 307/85 |
| 2005/0116694 | A1 * | 6/2005 | Hermann et al. | 323/247 |

FOREIGN PATENT DOCUMENTS

| | | |
|---|---|---|
| CN | 2466848 | 12/2001 |
| CN | 1159824 | 7/2004 |
| CN | 2694668 | 4/2005 |
| JP | 200092844 | 3/2000 |

OTHER PUBLICATIONS

International Search Report for International Patent Application No. PCT/CN/2007/000508 dated May 3, 2007.

* cited by examiner

*Primary Examiner* — Dharti Patel
(74) *Attorney, Agent, or Firm* — Harness, Dickey & Pierce, P.L.C.

(57) ABSTRACT

The invention relates to a voltage detection control technology, especially relate to a hardware overvoltage disconnecting circuit wherein a DC power supply module is disconnected from a power network when the AC power network is in the state of overvoltage. The hardware overvoltage disconnecting circuit comprises a disconnecting relay and a voltage detection circuit. The disconnecting relay is connected in series between an AC power network and a power factor correction circuit of a power supply module. A first sampling terminal of the voltage detection circuit samples the voltage of the AC power network between the AC power network and the disconnecting relay, and an output of the voltage detection circuit is connected to a control terminal of the disconnecting relay. When the AC power network is in the state of overvoltage, the disconnecting relay is disconnected and the power supply module is disconnected from the AC power network. When the voltage of the AC power network is normal, the disconnecting relay is connected. The circuit of the present invention is started up before the busbar voltage reaches its extreme value, and the relay can still work even if only the auxiliary power supply is working among all the components of the power supply module. The auxiliary power supply of the module is still in the work state. The cost of the system is reduced.

19 Claims, 5 Drawing Sheets

HARDWARE OVERVOLTAGE DISCONNECTING CIRCUIT

CROSS-REFERENCE TO RELATED APPLICATIONS

This application is a U.S. National Stage Application of International application No. PCT/CN2007/000508. filed Apr. 13, 2007 which was published in English as WO 2007/118400 on Oct. 25, 2007. This application claims the benefit of Chinese Application No. 200610074786.7, filed Apr. 13, 2006. The disclosures of the above applications are incorporated herein by reference.

FIELD OF THE INVENTION

The present invention relates to a field of voltage detection and control, and particularly relates to a hardware overvoltage disconnecting circuit which disconnects the power supply module (rectifier module) from the power network when the AC power network is in the state of overvoltage.

BACKGROUND OF THE INVENTION

In the prior art, there is a blind area about overvoltage protection, that is, at the moment of power on, the module input overvoltage protection is performed by the protection circuit of the module in normal work state. In this way, there exists a problem of the delayed protection. Therefore, the power supply module may have a possibility of breaking down or may break down immediately. In addition, a second auxiliary power supply board is required to identify and determine the input voltage after the power supply module is disconnected, so as to re-connect the power supply module to the system after the voltage of the power network is lowered. However, this leads to increased costs and decreased reliability

SUMMARY OF THE INVENTION

The object of the present invention is to provide a hardware overvoltage disconnecting circuit which can response timely and implement immediate protection when the power supply module are power-on, so that the power supply module is disconnected from the power network when the voltage of the power network increases to a predetermined value (or when both the voltages of the power network and the DC busbar reach the predetermined value), and the power supply module is connected to the power network when the voltage of the power network comes back to a certain value (or when both the voltages of the power network and the DC busbar come back to the certain value).

In order to achieve the above-mentioned object, the present invention provides a hardware overvoltage disconnecting circuit that comprises a disconnecting relay and a voltage detection circuit. The disconnecting relay is connected in series between an AC power network and a power factor correction circuit of a power supply module. A first sampling terminal of the voltage detection circuit samples the voltage of the AC power network between the AC power network and the disconnecting relay, and an output of the voltage detection circuit is connected to a control terminal of the disconnecting relay. When the AC power network is in the state of overvoltage, the disconnecting relay is disconnected and the power supply module is disconnected from the AC power network. When the voltage of the AC power network is normal, the disconnecting relay is connected.

As an improved embodiment, the voltage detection circuit further comprises a second sampling terminal for sampling a voltage of a DC busbar in the DC busbar of the power supply module. When the AC power network and the DC busbar are both in the state of overvoltage, the disconnecting relay is disconnected, and the power supply module is disconnected from the AC power network. When the voltages of the AC power network and the DC busbar are both normal, the disconnecting relay is connected to the power supply module.

As a embodiment of the present invention, the disconnecting relay is connected in series between the AC power network and a rectifier filter circuit of the power supply module.

As another embodiment of the present invention, the circuit of the present invention comprises two disconnecting relays respectively connected in series between the AC power network and two inputs of the power factor correction circuit. Both the control terminals of the disconnecting relays are connected to the output of the voltage detection circuit.

Specifically, a switch of the disconnecting relay is connected to one terminal of the AC power network. A normally closed contact of the disconnecting relay is connected to one input of the rectifier filter circuit, and a normally opened contact is floating. A first terminal of a winding of the disconnecting relay is coupled to the DC power supply, and a second terminal of the winding as a control terminal is connected to the output of the voltage detection circuit Further, the circuit of the present invention further comprises a current limiting resistor connected in series between the AC power network and the disconnecting relay.

When the circuit of the present invention only samples the voltage of the AC power network, the voltage detection circuit comprises a AC voltage detection section and a driving section that are connected in series. The AC voltage detection section comprises a voltage sampling unit and a peak-holding and logic-judging unit that are connected in series. An input of the voltage sampling unit is used as the sampling terminal of the voltage detection circuit, and an output of the driving section is used as the output of the voltage detection circuit.

When the circuit of the present invention samples the voltage of the power network and the DC busbar simultaneously, the voltage detection circuit comprises an AC voltage detection section, a busbar voltage detection section and a driving section. The AC voltage detection section comprises a voltage sampling unit and a peak-holding and logic-judging unit that are connected in series. An input of the voltage sampling unit and an input of the busbar voltage detection section are used, respectively, as the first sampling terminal and the second sampling terminal of the voltage detection circuit. The output of the peak-holding and logic-judging unit and the output of the busbar voltage detection section are coupled to each other, and a control signal is outputted to the driving section. An output of the driving section is used as the output of the voltage detection circuit.

Further, the voltage sampling unit mainly comprises a first diode, a second diode, a fifth resistor and a sixth resistor. An anode of the first diode is connected to one input of the AC power network. A cathode of the first diode is connected to a cathode of the second diode, and then is connected to one terminal of the fifth resistor. An anode of the second diode is connected to the other input of the AC power network. The other terminal of the fifth resistor is connected to one terminal of the sixth resistor. An output of the voltage sampling unit is coupled to an input of the peak-holding and logic-judging unit. The other terminal of the sixth resistor is grounded.

Further, the peak-holding and logic-judging unit mainly comprises a first operational amplifier and a first comparator. A noninverting input of the first operational amplifier is connected to an output of the voltage sampling unit, an inverting input of the first operational amplifier is connected to a noninverting input of the first comparator, and an output of the first operational amplifier is connected to the noninverting input of the first comparator by a series branch composed of a resistor and a diode, for holding the peak. An inverting input of the first comparator is coupled to a first reference source, the noninverting input of the first comparator is connected to its output by a series branch composed of a resistor and a diode, and the output of the first comparator is used as the output of the peak-holding and logic-judging unit. The inverting input of the first operational amplifier and the inverting input of the first comparator are both grounded by a resistance-capacitance parallel branch.

Further, the driving section is a switch transistor. The base of the switch transistor is used as an input of the driving section and is grounded by a resistor. The collector of the switch transistor is used as the output of the driving section, and is connected to the control terminal of the disconnecting relay. The emitter of the switch transistor is grounded.

Specifically, the busbar voltage detection section mainly comprises a second comparator. A noninverting input of the second comparator is used as a second input of the voltage detection circuit, and is connected to an output of the second comparator by a series branch composed of a resistor and a diode. An inverting input of the second comparator is coupled to a second reference source. An output of the second comparator is used as the output of the busbar voltage detection section.

The hardware overvoltage disconnecting circuit of the present invention samples the voltage value from the AC input of the power supply module, and disconnects the power supply module (typically the rectifier module in the power supply module) from the power network before the voltage of the power network reaches its extreme value, such that the protection circuit is started up before the busbar voltage reaches its extreme value, and the relay can still work even if only the auxiliary power supply is working among all the components of the power supply module. The circuit of the present invention simultaneously detects the DC busbar voltage, which functions as one of the factors used to determine whether or not the relay is to be disconnected. Thus a false protection resulted from a transient overvoltage is avoided. Meanwhile the circuit of the present invention continuously monitors the voltage of the power network (or simultaneously monitoring the voltage of the DC busbar) after the power supply module is disconnected from the power network, and re-connects the power supply module to the power network when the voltage of the power network returns to a certain value, thus the disconnecting relay 1 works in a hiccup mode. The circuit of the present invention always keeps the auxiliary power supply of the module in a work state by the intermittent charging of the busbar capacity. A peak holding circuit is used in the voltage detection circuit 2, such that the power supply module still has accurate sample value after the power supply module is disconnected from the AC power network. Meanwhile, the series connection of the disconnecting relay 1 and the current limiting resistor mitigates the startup current and restricts the charging voltage, and also functions to protect the relay and downsize the relay, and thus the cost of the system is reduced.

DETAIL DESCRIPTION OF PREFERRED EMBODIMENTS

The present invention will be further described hereinafter according to the attached drawings and the embodiments.

The First Embodiment

Figure 1:
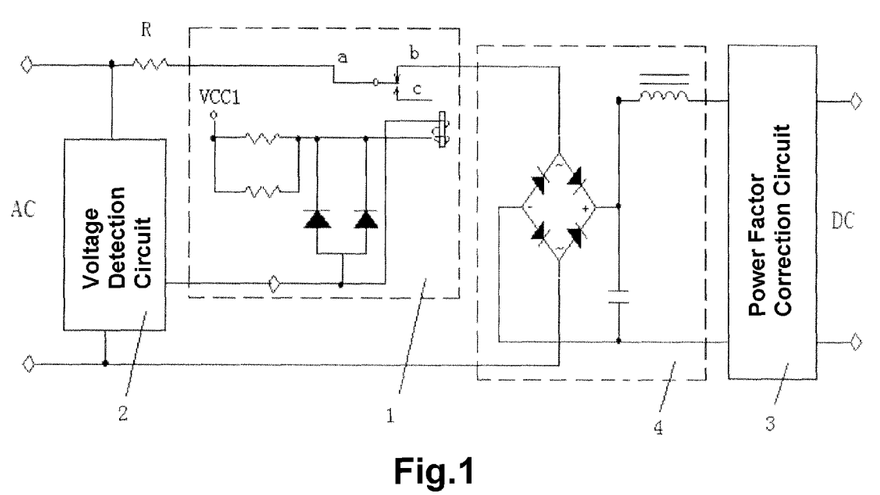
FIG. 1 is a block diagram showing the circuit structure of the hardware overvoltage disconnecting circuit according to the embodiment 1 of the invention.

As shown in FIG. 1, a hardware overvoltage disconnecting circuit of the present invention comprises a disconnecting relay 1 and a voltage detection circuit 2. The voltage detection circuit 2 comprises an AC voltage detection section and a driving section 21, which are connected in series. The AC voltage detection section comprises a voltage sampling unit 22 and a peak-holding and logic-judging unit 23, which are connected in series.

Wherein, the disconnecting relay 1 is connected in series between the AC power network and a rectifier filter circuit 4 of the power supply module, and may be connected in series to any input loop of the rectifier filter circuit 4. A switch (dynamic switch) of the disconnecting relay 1 is connected with one terminal of the AC power network. A normally closed contact b of the disconnecting relay 1 is connected with the first input of the rectifier filter circuit 4, and a normally opened contact c of the disconnecting relay 1 is floating. The first terminal of the winding of the disconnecting relay 1 is coupled with a DC power supply VCC1 via two resistors connected in parallel, and the second terminal of the winding, as a control terminal, is connected with the output of the voltage detection circuit 2. The disconnecting relay 1 further comprises two anti-parallel diodes, which are connected between the first terminal and the second terminal of the winding of the disconnecting relay 1. The disconnecting relay 1 further comprises a current limiting resistor R connected in series between the AC power network and the disconnecting relay 1. The resistor R is used for alleviating the starting current, limiting the charging voltage, and protecting and miniaturizing the disconnecting relay 1. The anti-power-surge resistor is chose for this resistor. In practice, the current limiting resistor may be a thermal resistor, a cement resistor, or the series connection of them. When the voltage of the power network is normal, the voltage detection circuit 2 does not input a control signal to the second terminal of the winding of the disconnecting relay 1, and there is no current flowing through the winding of the disconnecting relay 1. The power network and the subsequent circuits are connected through the switch a and the normally closed contact b.

Figure 2:
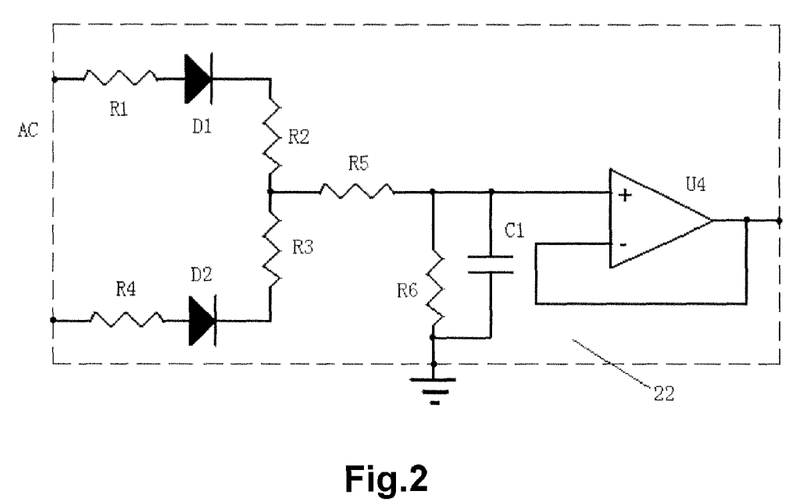
FIG. 2 is a schematic diagram showing the circuit structure of the sampling unit of the present invention.

As shown in FIG. 2, the voltage sampling unit 22 comprises the first through the sixth resistors (R1-R6), the first diode D1, the second diode D2, the filter capacitor C1, and the fourth operational amplifier U4, wherein the alternating-current AC is converted into half-waves by the voltage sampling unit 22 through a series branch comprising the first resistor R1, the first diode D1, and the second resistor R2, and a series branch comprising the third resistor R3, the second diode D2, and the fourth resistor R4, which is then divided by the fifth resistor R5 and the sixth resistor R6. The divided voltage is outputted to the peak-holding and logic-judging unit 23 via the fourth operational amplifier U4 connected as a voltage follower, wherein, the fourth operational amplifier U4 is used for isolating the front and the back circuits so as to prevent the signal interference.

Figure 3:
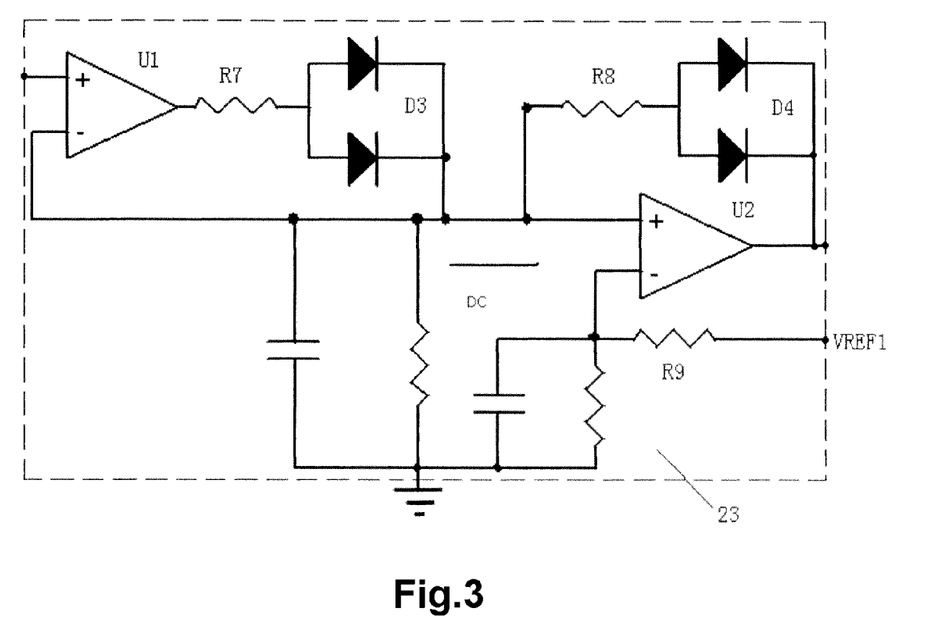
FIG. 3 is a schematic diagram showing the circuit structure of peak-holding and logic-judging unit 23 of the present invention.

As shown in FIG. 3, the peak-holding and logic-judging unit 23 mainly comprises a first operational amplifier U1 and a first comparator U2. The noninverting input of the first operational amplifier U1 is connected with the output of the aforesaid fourth operational amplifier U4, its inverting input is connected with the noninverting input of the first comparator U2, and its output is connected to the noninverting input of the first comparator U2 through the series branch including the seventh resistor R7 and the third diode D3. The inverting input of the first comparator U2 is connected to the first reference source VREF1 through the nineth resistor R9, and the noninverting input of the first comparator U2 is connected to the output of the first comparator U2 through the series branch including the eighth resistor R8 and the fourth diode D4, and the output of the first comparator U2 is configured as the output of the peak-holding and logic-judging unit 23 to connect to the input of the driving section 21. The inverting input of the first operational amplifier U1 and that of the first comparator U2 are connected to the ground through the parallel resistance-capacitance (RC) branch. The first operational amplifier U1, the seventh resistor R7, and the third diode D3 perform the peak-holding function, and the eighth resistor R8 and the fourth diode D4 are used to set the return difference of the first comparator U2. The fourth diode can be connected inversely, but the operational principle is the same as that of the above-mentioned connection. The first reference source VREF1 determines the protection voltage. When the AC power network is in the state of overvoltage, the disconnecting relay 1 is disconnected, the power supply module and the AC power network are disconnected, and the voltage sampling unit 22 in front of the disconnecting relay 1 can only be half-wave conducted so that the output waveform of the voltage sampling unit 22 is half-wave asymmetric. Using the peak-holding can eliminate the effective value sampling error due to the asymmetric waveform caused by the circuit half-wave conducting after the relay is disconnected. The actual effective value of the module input port cannot be derived from the detection method of the effective value when the peak value does not correspond to the effective value. For example, when the input effective value of the AC power network is 300V, the output of the effective value detection circuit is 3V before the power supply module is disconnected. When the power supply module is disconnected, the output of the effective value detection circuit is 2.4V due to the half-wave asymmetric, which will cause the confusion of the logic and the inaccuracy of the voltage detection circuit 2, or even worse, which will cause the power supply module to be damaged. After the peak-holding is used, the peak value of at least one half-wave of the input voltage of the peak-holding and logic-judging unit 23 corresponds to the actual effective value even if the half-waves are asymmetric, and thus the driving section 21 can accurately output the control signal to the disconnecting relay 1.

Figure 4:
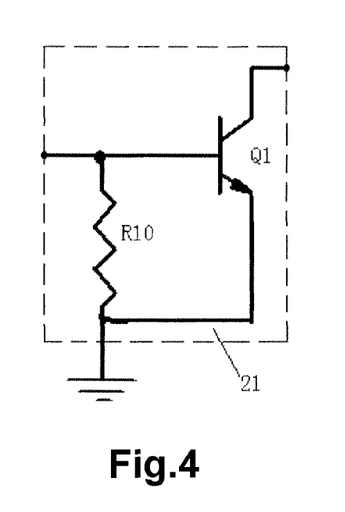
FIG. 4 is a schematic diagram showing the circuit structure of driving section 21 of the present invention.

As shown in FIG. 4, the driving section 21 uses a switch transistor Q1 to perform the driving function. The switch transistor may be one of the triode, IGBT, etc. In the present embodiment, the triode is used. The base electrode of the switch transistor Q1, as the input of the driving section 21, is connected with the output of the aforesaid first comparator U2, and is connected to the ground via the tenth resistor R10. The collector electrode of the switch transistor Q1, as the output of the driving section 21, is connected to the second terminal of the winding of the disconnecting relay 1, and the emitter electrode of the switch transistor Q1 is connected to the ground. The base electrode of the switch transistor Q1 can also be connected to the output of the first comparator U2 through an inversely connected diode.

Thus, the circuit of the present invention starts operating when the power supply module is powered on. The voltage of the AC power network is detected by the voltage sampling unit 22 in real time, and is outputted to the peak-holding and logic-judging unit 23. The first comparator U2 compares the effective value inputted to the noninverting input thereof with the reference source voltage. If the voltage of the power network exceeds a preset value, the first comparator U2 will output a high level to the switch transistor Q1, then the switch transistor Q1 is turned on, and there is current flowing through the winding of the disconnecting relay 1. The switch of the disconnecting relay 1 is switched to the normally opened contact c, and then the power supply module is disconnected from the AC power network. When the voltage of the AC power network drops to a certain value (the difference value between the certain value and the aforesaid preset value is determined by the return difference), the first comparator U2 is reversed to output a low level to the base electrode of the switch transistor Q1, the switch transistor Q1 is cut off, the second input of the winding of the disconnecting relay 1 is substantially floating, and the disconnecting relay 1 does not work. The switch a of the disconnecting relay 1 is switched to the normally opened contact c, and the power supply module is connected to the AC power network again.

Figure 10:
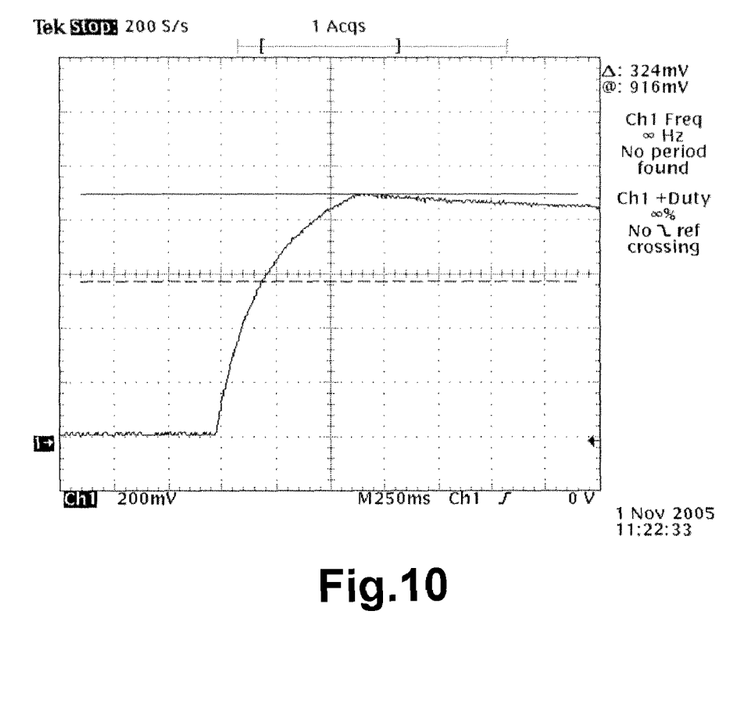
FIG. 10 is the wave pattern of the measured busbar voltage when the power supply module is powered under overvoltage.

In practice, the limit of the busbar voltage DC is 450V. The disconnecting point of the relay is set to be the AC voltage at the time that the rectified busbar voltage is 450V, which is about 320V. In a practical test, the power supply module is powered on when the input AC of the AC power network is 415V (if the busbar is rectified, the voltage is about 587V). When the busbar voltage is 0.916*500=458V, the disconnecting relay 1 of the present invention acts, the power supply module is disconnected from the power network, and the busbar voltage starts decreasing, as shown in FIG. 10. The power supply module is usually provided with a DSP module, which can be used for software protection. However, the DSP module cannot be powered on when the power supply module starts up. Nonetheless, in the present invention, the protection can be performed as soon as the power supply module starts up, which resolves the problem of no protection at the moment of starting up the machine.

The Second Embodiment

Figure 5:
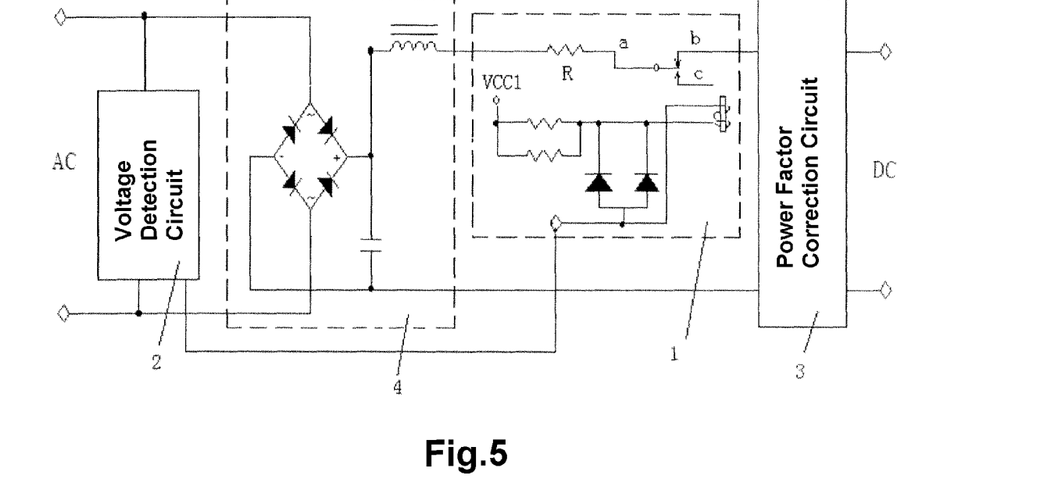
FIG. 5 is a block diagram showing the circuit structure of an embodiment 2 of the present invention.

As shown in FIG. 5, the hardware overvoltage disconnecting circuit of the present embodiment differs from that of the first embodiment in that the disconnecting relay 1 is connected in series between the rectifier filter circuit 4 and the power factor correction circuit 3 (PFC circuit), which has the same operational principle as that of the first embodiment.

The Third Embodiment

Figure 6:
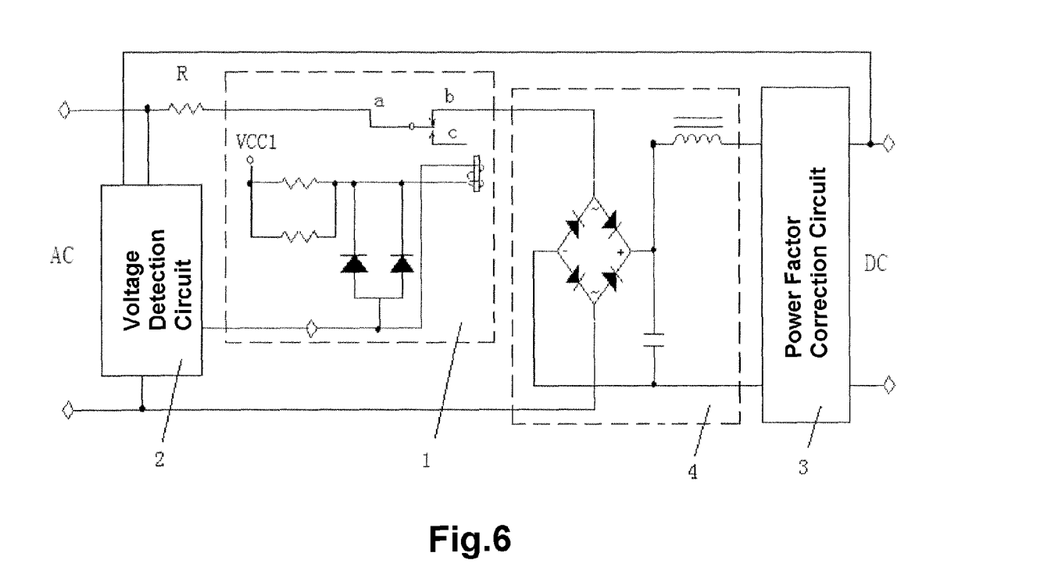
FIG. 6 is a block diagram showing the circuit structure of an embodiment 3 of the present invention.
Figure 7:
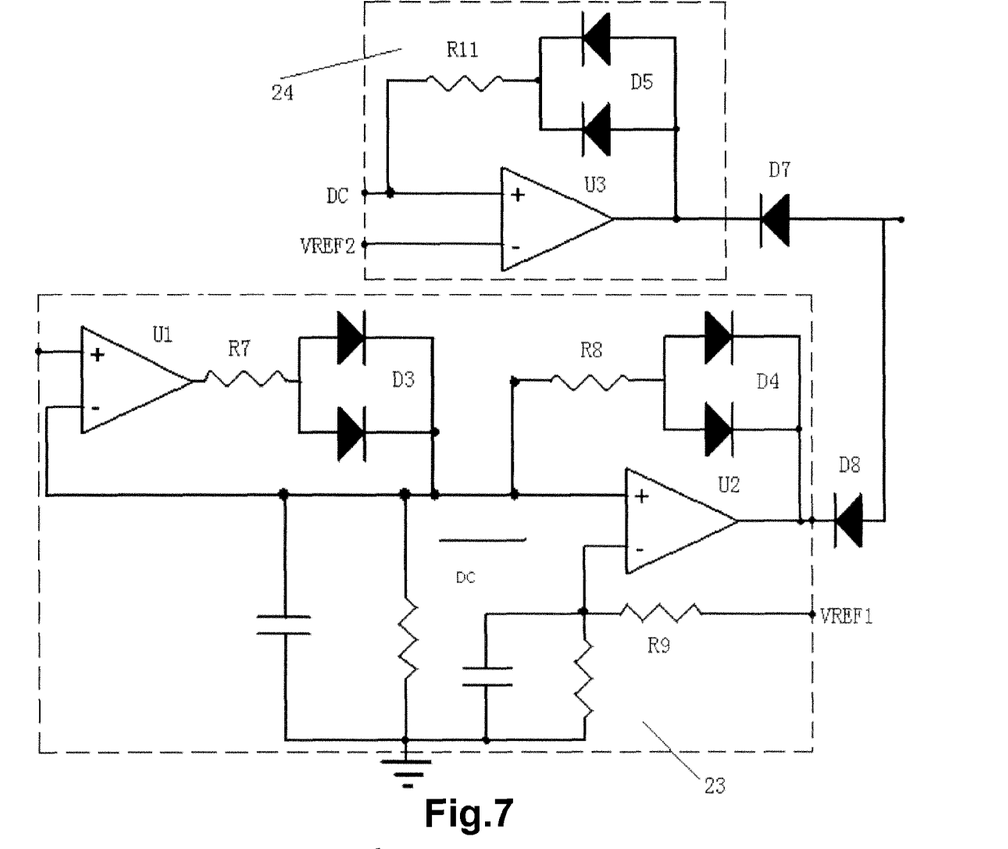
FIG. 7 is a schematic diagram showing the circuit structure of the AC voltage detection section and the voltage detection section of the busbar 24 according to the embodiment 3 of the present invention.

As shown in FIGS. 6 and 7, the hardware overvoltage disconnecting circuit of the present invention includes a disconnecting relay 1 and a voltage detection circuit 2. The voltage detection circuit 2 includes an AC voltage detection section, a busbar voltage detection section 24, and a driving section 21, which are connected in series. In this embodiment, the connection of the disconnecting relay 1 is the same as that of the first embodiment. The circuit construction and operational principle of the AC voltage detection section and the driving section 21 are similar to those in the first embodiment, that is, the voltage detection circuit 2 is the same as that of the first embodiment, comprising a voltage sampling unit 22, a peak-holding and logic-judging unit 23 which are connected in series; the circuit of the driving section 21 is the same as that of the first embodiment. What is different is that the input of the voltage sampling unit 22 and the input of the busbar voltage detection section 24 are used as a first sampling terminal and a second sampling terminal of the voltage detection circuit 2, respectively; an output of the peak-holding and logic-judging unit 23 and an output of the busbar voltage detection section 24 are connected via a seventh diode D7 and a eighth diode D8 which are connected backward, and a control signal is outputted to the driving section 21. The second sampling terminal is connected to a power factor correction circuit 3 of a power supply module, that is, to the high side of the DC busbar, for sampling the voltage DC of the DC busbar.

The busbar voltage detection section 24 is mainly comprised of second comparator U3. The noninverting input of the second comparator U3 as a second sampling terminal of the voltage detection circuit 2 is connected to the high side of the DC busbar, and at the same time, the noninverting input of the second comparator U3 is connected to the output of the second comparator U3 via a series branch comprised of an eleventh resistor R11 and a fifth diode D5, the inverting input of the second comparator U3 is coupled to the second reference source VREF2, and the output of the comparator U3 as the output of the busbar voltage detection section 24 is connected to the cathode of the eighth diode D8. The anode of the eighth diode D8 is connected to the input of the driving section 21. In this case, the fifth diode D5 can be connected backward or forward.

Thus, only when the overvoltage occurs in the AC power network and the DC busbar at the same time, the disconnecting relay 1 is disconnected from the power network, and the disconnecting relay 1 is not connected until the voltage of the AC power network and the voltage of the DC busbar both return to normal. This improves the anti-interference and the accuracy of actions of the system.

Similar to the second embodiment, in the present embodiment, the disconnecting relay 1 can be connected in series between the rectifier filter circuit 4 and the power factor correction circuit 3, and the operational principle thereof is the same as that of the circuit of the present embodiment.

The Fourth Embodiment

Figure 8:
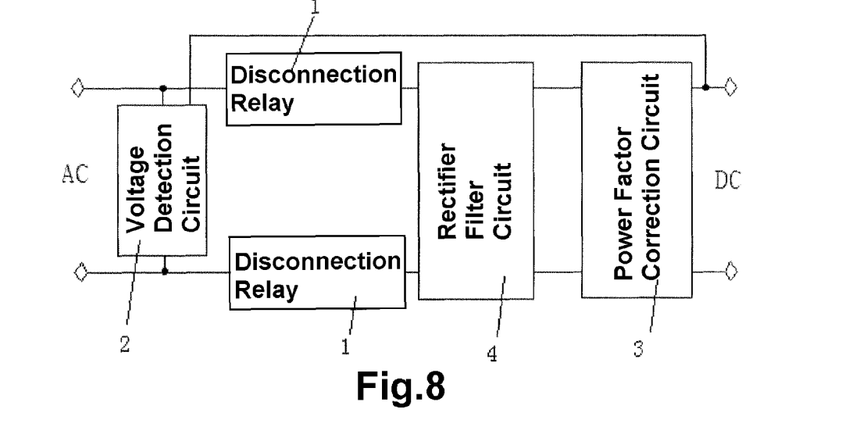
FIG. 8 is block diagram showing the circuit structure of an embodiment 4 of the present invention.

As shown in FIG. 8, the present embodiment is different from the third embodiment by adding a disconnecting relay 1, that is, a disconnecting relay 1 is connected in series between the two inputs of the AC power network and the rectifier filter circuit 4, respectively. The control terminal of the two disconnecting relays 1 are both connected to the output of the voltage detection circuit 2. A current limiting resistor R is connected in series in front of each disconnecting relay 1. The operational principle of the circuit is similar to the third embodiment.

Similar to the second embodiment, in the present embodiment, the disconnecting relay 1 can be connected in series between the rectifier filter circuit 4 and the power factor correction circuit 3, and the operational principle thereof is similar to that of the present circuit.

The Fifth Embodiment

Figure 9:
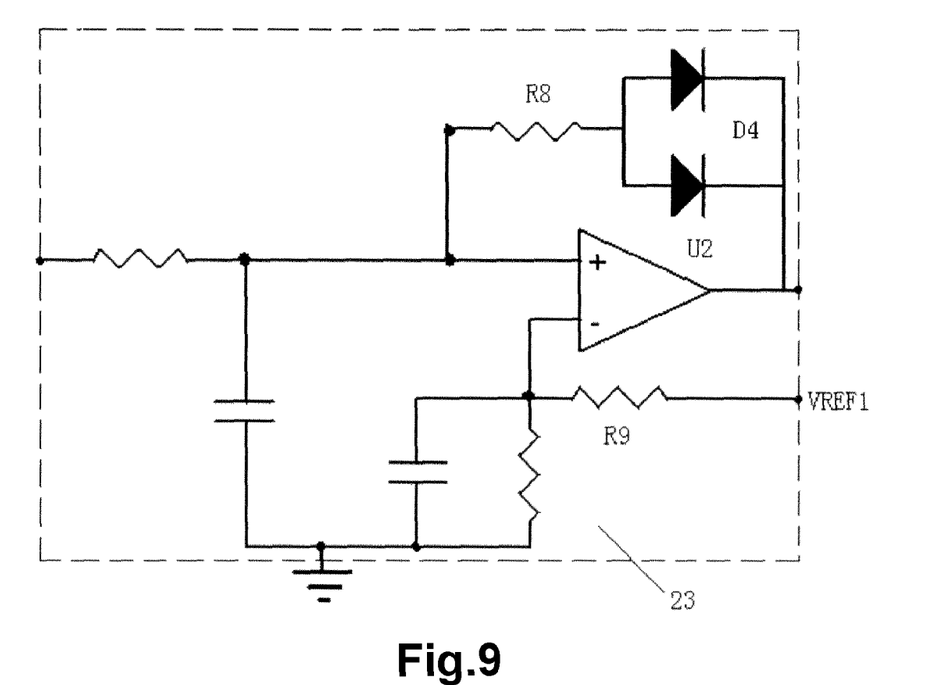
FIG. 9 is a schematic diagram showing the peak-holding and logic-judging unit 23 of an embodiment 5 of the present invention.

The present embodiment is different from the above embodiments in that the peak-holding function is not used in the peak-holding and logic-judging circuit any more, and an average method is used in sampling, as shown in FIG. 9. The present embodiment is applicable to power supply modules when high accuracy of protection is not necessary.

What we claim is:

1. A hardware overvoltage disconnecting circuit, comprising:
    a disconnecting relay in series between an AC power network and a power factor correction circuit of a power supply module; and
    a voltage detection circuit;
    wherein a first sampling terminal of the voltage detection circuit samples the voltage of the AC power network between the AC power network and the disconnecting relay, and an output of the voltage detection circuit is connected to a control terminal of the disconnecting relay;
    further wherein when the AC power network is in a state of overvoltage, the disconnecting relay disconnects the power supply module from the AC power network; when the voltage of the AC power network is normal, the disconnecting relay connects the power supply module and the AC power network; and
    wherein the voltage detection circuit further comprises a second sampling terminal for sampling a voltage of a DC busbar of the power supply module, further wherein when the AC power network and the DC busbar are both in the state of overvoltage, the disconnecting relay disconnects the power supply module from the AC power network; when the voltages of the AC power network; and the DC busbar are both normal, the disconnecting relay connects the power supply module and the DC power network.

2. The hardware overvoltage disconnecting circuit of claim 1, wherein the disconnecting relay is connected in series between the AC power network and a rectifier filter circuit of the power supply module.

3. The hardware overvoltage disconnecting circuit of claim 1 further comprising two disconnecting relays respectively connected in series between the AC power network and two inputs of the power factor correction circuit, wherein both the control terminals of the disconnecting relays are connected to the output of the voltage detection circuit.

4. The hardware overvoltage disconnecting circuit of claim 1, wherein:
    a switch of the disconnecting relay is connected to one terminal of the AC power network;
    a normally closed contact of the disconnecting relay is connected to one input of the rectifier filter circuit,
    a normally opened contact is floating;
    a first terminal of a winding of the disconnecting relay is coupled to a DC power supply; and a second terminal of the winding is connected to the output of the voltage detection circuit.

5. The hardware overvoltage disconnecting circuit of claim 4, further comprising a current limiting resistor connected in series between the AC power network and the disconnecting relay.

6. The hardware overvoltage disconnecting circuit of claim 1, wherein the voltage detection circuit comprises:
an AC voltage detection section;
a busbar voltage detection section; and
a driving section,
wherein the AC voltage detection section includes a voltage sampling unit and a peak-holding and logic-judging unit connected in series,
wherein an input of the voltage sampling unit and an input of the busbar voltage detection section are used, respectively, as the first sampling terminal and the second sampling terminal of the voltage detection circuit; and
wherein the output of the peak-holding and logic-judging unit and the output of the busbar voltage detection section are coupled to each other, and a control signal is output to the driving section, and an output of the driving section is used as the output of the voltage detection circuit.

7. The hardware overvoltage disconnecting circuit of claim 6, wherein the voltage sampling unit further comprises:
a first diode;
a second diode;
a fifth resistor; and
a sixth resistor; wherein
an anode of the first diode is connected to one input of the AC power network, and a cathode of the first diode is connected to a cathode of the second diode and to one terminal of the fifth resistor; an anode of the second diode is connected to the other input of the AC power network; the other terminal of the fifth resistor is connected to one terminal of the sixth resistor; an output of the voltage sampling unit is coupled to an input of the peak-holding and logic-judging unit; and the other terminal of the sixth resistor is grounded.

8. The hardware overvoltage disconnecting circuit of claim 6, wherein the peak-holding and logic-judging unit further comprises:
a first operational amplifier; and
a first comparator;
wherein a noninverting input of the first operational amplifier is connected to an output of the voltage sampling unit, an inverting input of the first operational amplifier is connected to a noninverting input of the first comparator, and an output of the first operational amplifier is connected to the noninverting input of the first comparator by a series branch composed of a resistor and a diode and
wherein an inverting input of the first comparator is coupled to a first reference source, the noninverting input of the first comparator is connected to its output by a series branch including a resistor and a diode, the output of the first comparator is used as the output of the peak-holding and logic-judging unit; and
wherein the inverting input of the first operational amplifier and the inverting input of the first comparator are both grounded by a resistance-capacitance parallel branch.

9. The hardware overvoltage disconnecting circuit of claim 6, wherein the driving section is a switch transistor; wherein the base of the switch transistor is an input of the driving section and is grounded by a resistor, the collector of the switch transistor is the output of the driving section and is connected to the control terminal of the disconnecting relay; and the emitter of the switch transistor is grounded.

10. The hardware overvoltage disconnecting circuit of claim 6, wherein the busbar voltage detection section further comprises:
a second comparator;
wherein a noninverting input of the second comparator is a second input of the voltage detection circuit and is connected to an output of the second comparator by a series branch including a resistor and a diode; an inverting input of the second comparator is coupled to a second reference source; and an output of the second comparator is the output of the busbar voltage detection section.

11. The hardware overvoltage disconnecting circuit of claim 1, wherein the disconnecting relay is in series between the AC power network and a rectifier filter circuit of the power supply module.

12. The hardware overvoltage disconnecting circuit of claim 1 further comprising two disconnecting relays connected in series between the AC power network and two respective inputs of the power factor correction circuit, wherein both the control terminals of the disconnecting relays are connected to the output of the voltage detection circuit.

13. The hardware overvoltage disconnecting circuit of claim 1, wherein:
a switch of the disconnecting relay is connected to one terminal of the AC power network;
a normally closed contact of the disconnecting relay is connected to one input of the rectifier filter circuit,
a normally opened contact is floating;
a first terminal of a winding of the disconnecting relay is coupled to the DC power supply; and
a second terminal of the winding is connected to the output of the voltage detection circuit.

14. A hardware overvoltage disconnecting circuit, comprising:
a disconnecting relay in series between an AC power network and a power factor correction circuit of a power supply module;
a voltage protection circuit;
wherein a first sampling terminal of the voltage detection circuit samples the voltage of the AC power network between the AC power network and the disconnecting relay, and an output of the voltage detection circuit is connected to a control terminal of the disconnecting relay;
further wherein when the AC power network is in a state of overvoltage, the disconnecting relay disconnects the power supply module from the AC power network;
when the voltage of the AC power network is normal, the disconnecting relayconnects the power supply module and the AC power network,
wherein the voltage detection circuit comprises an AC voltage detection section and a driving section that are connected in series; and
wherein the AC voltage detection section includes a voltage sampling unit and a peak-holding and logic-judging unit connected in series; and
wherein an input of the voltage sampling unit is used as the sampling terminal of the voltage detection circuit, and an output of the driving section is the output of the voltage detection circuit.

15. The hardware overvoltage disconnecting circuit of claim 14, wherein the voltage sampling unity further comprises:
   a first diode;
   a second diode;
   a fifth resistor; and
   a sixth resistor; wherein
   an anode of the first diode is connected to one input of the AC power network, and a cathode of the first diode is connected to a cathode of the second diode and to one terminal of the fifth resistor; an anode of the second diode is connected to the other input of the AC power network; the other terminal of the fifth resistor is connected to one terminal of the sixth resistor; an output of the voltage sampling unit is coupled to an input of the peak-holding and logic-judging unit; and the other terminal of the sixth resistor is grounded.

16. The hardware overvoltage disconnecting circuit of claim 14, wherein the peak-holding and logic-judging unit further comprises:
   a first operational amplifier;
   and a first comparator;
   wherein a noninverting input of the first operational amplifier is connected to an output of the voltage sampling unit, an inverting input of the first operational amplifier is connected to a noninverting input of the first comparator, and an output of the first operational amplifier is connected to the noninverting input of the first comparator by a series branch including a resistor and a diode; and
   wherein an inverting input of the first comparator is coupled to a first reference source, the noninverting input of the first comparator is connected to its output by a series branch including a resistor and a diode, and the output of the first comparator is used as the output of the peak-holding and logic-judging unit; and
   wherein the inverting input of the first operational amplifier and the inverting input of the first comparator are both grounded by a resistance-capacitance parallel branch.

17. The hardware overvoltage disconnecting circuit of claim 14, wherein the driving section is a switch transistor, wherein the base of the switch transistor is an input of the driving section and is grounded by a resistor, the collector of the switch transistor is the output of the driving section, and is connected to the control terminal of the disconnecting relay, and the emitter of the switch transistor is grounded.

18. The hardware overvoltage disconnecting circuit of claim 14, wherein the busbar voltage detection section further comprises:
   a second comparator;
   wherein a noninverting input of the second comparator is a second input of the voltage detection circuit, and is connected to an output of the second comparator by a series branch including a resistor and a diode; an inverting input of the second comparator is coupled to a second reference source; and an output of the second comparator is the output of the busbar voltage detection section.

19. A hardware overvoltage disconnecting circuit, comprising:
   a disconnecting relay in series between an AC power network and a power factor correction circuit of a power supply module; and
   a voltage detection circuit;
   wherein a first sampling terminal of the voltage detection circuit samples the voltage of the AC power network between the AC power network and the disconnecting relay, and an output of the voltage detection circuit is connected to a control terminal of the disconnecting relay;
   further wherein when the AC power network is in the state of overvoltage, the disconnecting relay disconnects the power supply module from the AC power network; when the voltage of the AC power network is normal, the disconnecting relay connects the power supply module and the AC power network.

* * * * *